(No Model.)

J. H. LAWLESS.
SELF ACTING SUPPLY TANK.

No. 338,984. Patented Mar. 30, 1886.

WITNESSES:
Jos. W. Rosenbaum
Sidney Mann

INVENTOR
John H. Lawless
BY Goepel & Raegener
his ATTORNEYS.

United States Patent Office.

JOHN H. LAWLESS, OF JERSEY CITY, NEW JERSEY.

SELF-ACTING SUPPLY-TANK.

SPECIFICATION forming part of Letters Patent No. 338,984, dated March 30, 1886.

Application filed January 28, 1886. Serial No. 190,044. (No model.)

*To all whom it may concern:*

Be it known that I, JOHN H. LAWLESS, of Jersey City, in the county of Hudson and State of New Jersey, have invented certain new and useful Improvements in Self-Acting Supply-Tanks, of which the following is a specification.

This invention relates to an improved supply-tank for tenement-houses and dwellings of all kinds, by which the water is supplied automatically without the use of pumping apparatus to all the floors of the building by utilizing the pressure in the main supply-pipe; and the invention consists of a hermetically-closed supply-tank, that is provided at the bottom with a valved supply-pipe communicating with the main, and with a discharge-pipe connecting with the service-pipes, the supply and discharge pipes being provided with stop-cocks for cutting out the tank, if necessary.

Figure 1:
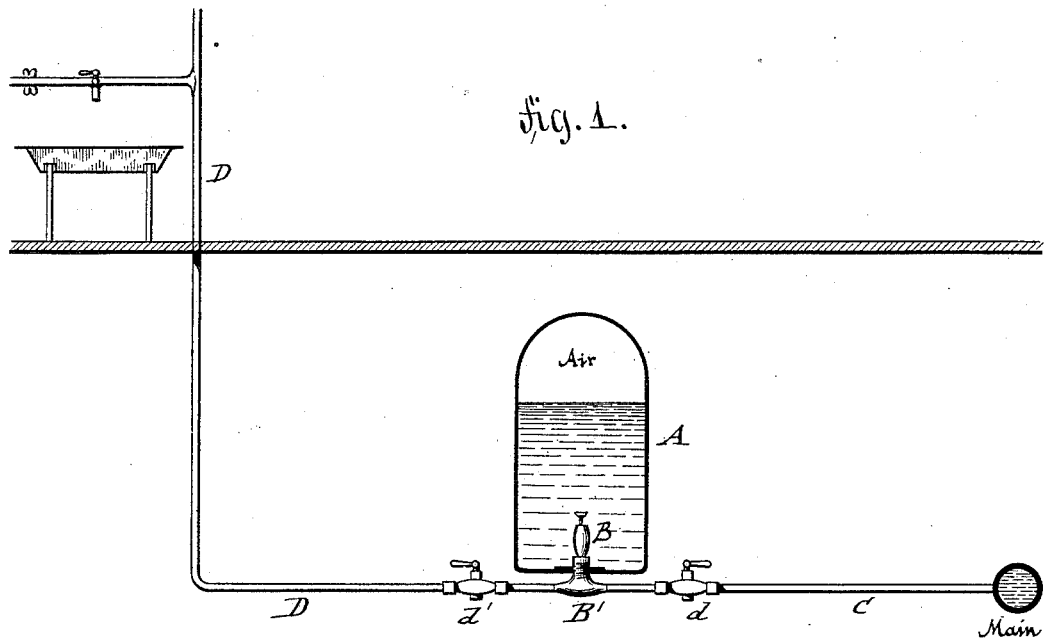
Figure 2:
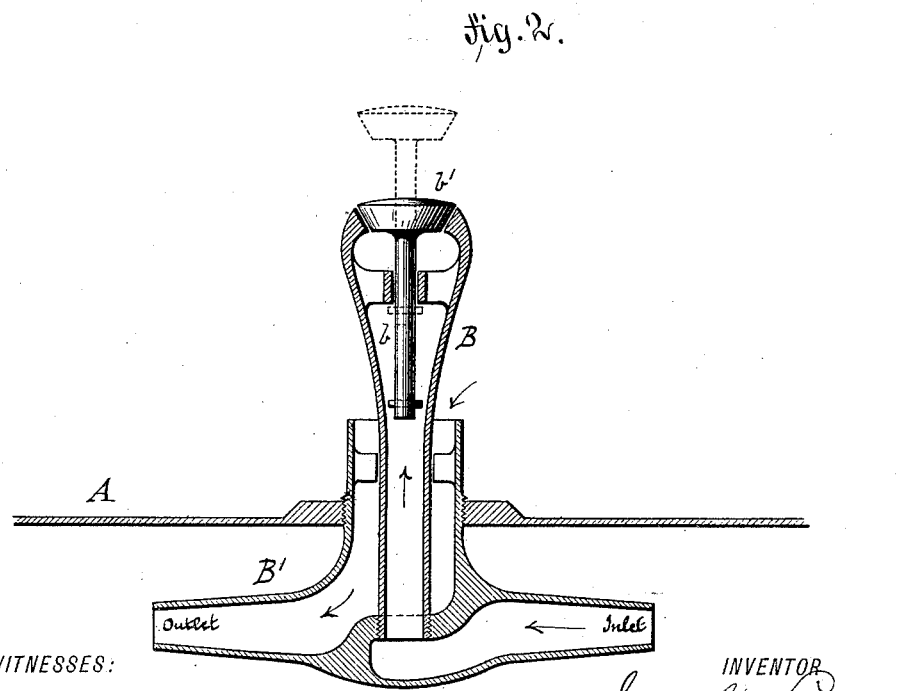

In the accompanying drawings, Figure 1 represents a vertical longitudinal section of my improved supply-tank for dwellings, and Fig. 2 is a vertical central section of the combined inlet and outlet pipe of the tank drawn on a larger scale.

Similar letters of reference indicate corresponding parts.

Referring to the drawings, A represents a hermetically-closed supply-tank, which is made of cylindrical shape and hemispherical top, and of a size corresponding to the quantity of water to be supplied. The supply-tank A is made of sheet metal of suitable strength, and provided at the bottom with a combined inlet and outlet pipe, B B', the interior inlet-pipe of which is connected by a pipe, C, with the main, while the exterior outlet-pipe, B', is connected by a service-pipe, D, with the different stories of the building to be supplied with water. The supply-pipe C and service-pipe D are provided with stop-cocks $d\ d'$, by which the supply-tank can be cut out when it is desired to repair or clean the same. The interior or inlet pipe, B, is provided with a valve, $b'$, the stem $b$ of which is guided in bearings of the outlet-pipe, as shown in Fig. 2.

The water is supplied to the tank A through the valved inlet-pipe B, the valve $b'$ being lifted by the pressure of the water as long as the same is stronger than the counter-pressure of the body of the air at the upper part of the tank. When the air is compressed to such a degree that the pressure of the water in the main is counterbalanced, the inlet-pipe is closed by its valve, and the water in the tank retained at a certain level.

When the water is drawn in any one or more stories of the building, the pressure of the air on the water in the tank will force the water from the tank in the service-pipes to the different stories. One or more faucets can be opened at the same time, as the tank will be able to supply them all at the same time.

As soon as the level of the water falls in the tank the pressure of the air in the upper part of the tank is reduced and a new supply of water forced in from the main until the equilibrium between the water-pressure in the main and the pressure of the air in the tank is re-established.

The greater the pressure in the main the greater the compression of the air in the tank, and consequently the higher will the same lift the water in the building. The tank serves as a storage-receptacle for the water, as well as for the power by which the water is lifted, so that a regular supply of water can be automatically furnished to the different stories of a building without requiring expensive pumping apparatus.

Having thus described my invention, I claim as new and desire to secure by Letters Patent—

1. A hermetically-closed water-supply tank provided at the bottom with a combined inlet and outlet pipe, the inlet-pipe passing centrally through the outlet-pipe and having a valve-seat and valve at its upper end, substantially as set forth.

2. The combination of a hermetically-closed supply-tank, a combined inlet and outlet pipe, the inlet-pipe extending centrally through the outlet-pipe and having a valve, a supply-pipe connecting the inlet-pipe with the main, and a service-pipe connected to the outlet-pipe, substantially as set forth.

In testimony that I claim the foregoing as my invention I have signed my name in presence of two subscribing witnesses.

JOHN H. LAWLESS.

Witnesses:
PAUL GOEPEL,
MARTIN PETRY.